Nov. 15, 1966 D. H. COVILL 3,286,256
METHOD AND APPARATUS FOR ZERO I.F. FREQUENCY AND
IONOSPHERIC PULSE RECEPTION
Original Filed July 1, 1963
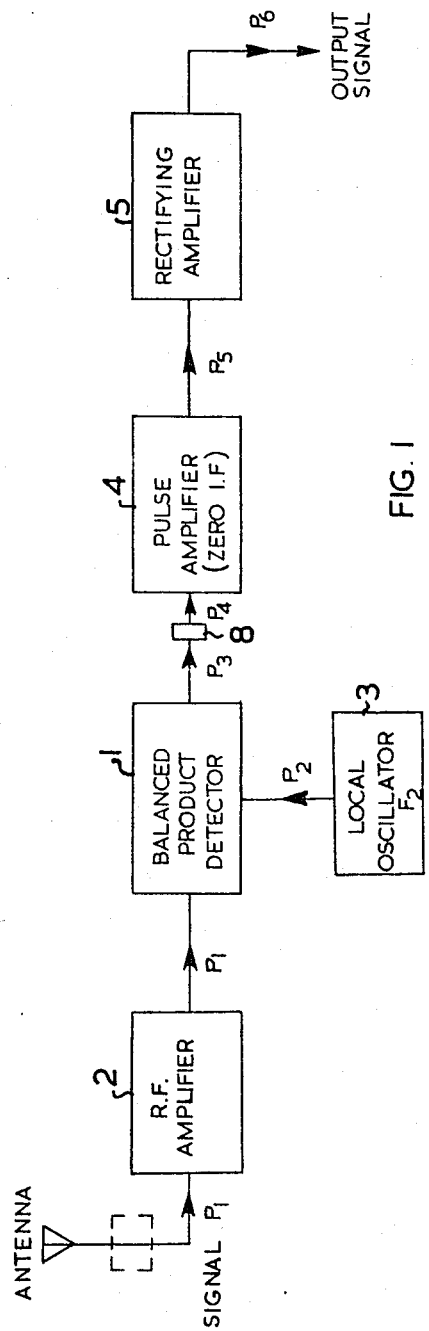
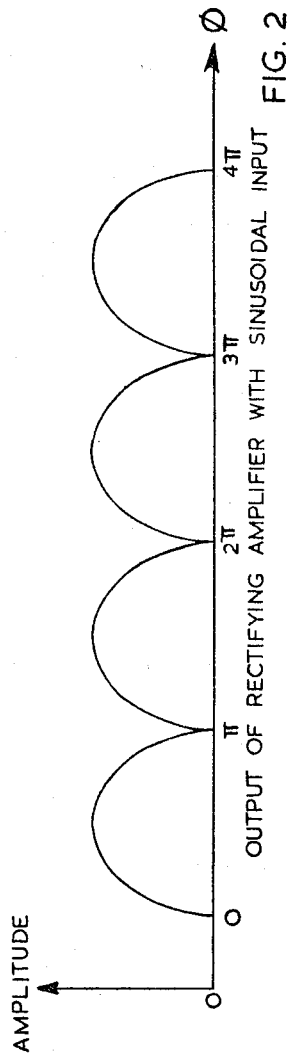
INVENTOR
DENNIS HENRY COVILL

United States Patent Office 3,286,256
Patented Nov. 15, 1966

3,286,256
METHOD AND APPARATUS FOR ZERO I.F. FREQUENCY AND IONOSPHERIC PULSE RECEPTION
Dennis H. Covill, Hackett Cove, Nova Scotia, Canada, assignor to E.M.I.-Cossor Electronics Ltd., Dartmouth, Nova Scotia, Canada
Continuation of abandoned application Ser. No. 291,992, July 1, 1963. This application July 20, 1965, Ser. No. 480,225
Claims priority, application Canada, June 14, 1963, 877,931
5 Claims. (Cl. 343—5)

This application is a continuation of application No. 291,992 filed by me on July 1, 1963 and now abandoned.

This invention relates to a method and apparatus for Zero I.F. frequency moving target radar and ionospheric pulse reception.

Moving target radar and ionospheric pulse receivers at the present time are conventional superheterodyne receivers with an intermediate frequency in the range from 100 kc./s. to 45 mc/s. Such receivers require a frequency synthesizer as a local oscillator source having an output frequency which differs from that of the receiver by the I.F.

Receivers for such reception have been proposed using a Zero I.F. frequency and are variously known as the Synchrodyne, Homodyne, etc. These receiver designs, however, have in general relied on a steady incoming carrier to phase synchronize the local oscillator and have not been suitable for pulse application.

In the receiver of this invention, advantage is taken of the fact that moving target radar and ionospheric pulse reflections are time-phase modulated and that no requirement necessarily exists to synchronize the local oscillator to the incoming pulse.

It is an object of this invention to provide a Zero I.F. frequency moving target radar or ionospheric pulse receiver having simplicity and versatility and adaptability for varying nett receiver bandwith by adjusting the cut-off frequency of the pulse amplifier.

It is a further object of the invention to provide a Zero I.F. frequency moving target radar or ionospheric pulse receiver in which no separate frequency synthesizer is required and wherein the transmitter synthesizer is also used for the local oscillator.

It is another object of this invention to provide a Zero I.F. frequency moving target radar or ionospheric pulse receiver whose performance is not appreciably impaired by heavy C.W. interference of the type experienced in normal receiver designs.

The invention consists in a moving target radar or ionospheric pulse signal receiver for receiving echo signals comprising pulses of oscillation of which the frequency is known and of which the phase varies as a function of time, depending upon the propagation time from the transmitter to the receiver, comprising means for forming the product of the received pulses and an oscillation of said known frequency, means for selecting from the output of the product forming means the component corresponding to the pulse envelope of the received signal, the amplitude and polarity of said pulse envelope being a function inter alia of the phase variation of said oscillation, means for deriving from said pulse envelope component, rectifying said pulse envelope component to derive uni-directional signal containing excursions of only one polarity, and means for integrating said unidirectional signal over an interval of time sufficient to derive an output signal substantially independent of said variations in pulse envelope amplitude and polarity due to said phase variations.

The invention is illustrated, by way of example, in the accompanying drawings in which:

FIGURE 1 is a receiver block diagram of one example of a receiver according to the invention, and FIGURE 2 shows how the output of the rectifying amplifier varies in amplitude as a function of $\phi$, the incoming signal phase angle.

FIGURE 1 shows a block diagram of the Zero I.F. frequency moving target radar or ionospheric pulse receiver. The incoming signal is intercepted by the antenna and passed to a balanced product detector 1. For convenience, the incoming signal function is designated $P_1$ and is fed to the balanced product detector 1. The incoming signal $P_1$, is preferably preamplified in a tuned R.F. amplifier 2, before being detected. A local oscillator 3 generates a local oscillator signal function $P_2$. The product detector 1 will develop an output signal proportional to the product of the incoming signal $P_1$ and the local oscillator signal function $P_2$. The incoming signal $P_1$ and the local oscillator signal function $P_2$ may be conveniently expressed by the following two expressions:

incoming signal function $P_1 = kP \sin(wt + \phi)$ local oscillator function $P_2 = a \sin wt$ where $a$ and $k$ are constants, $P$ is a pulse envelope function of the incoming signal and $\phi$ is a phase variable depending on the exact propagation time of the ionospheric path.

If the output from the balanced product detector 1 is represented by $P_3$, then $$P_3 = akP \sin wt(wt+\phi)$$
$$= \tfrac{1}{2} akP \{\cos(2wt+\phi) + \cos \phi\}$$

The high frequency term $\cos(2wt+\phi)$, will then be removed, by filtering, by filter 8, giving a net output signal designated $P_4$ such that $$P_4 = \tfrac{1}{2} akP \cos \phi$$

This expression indicates that the signal $P_4$ is an oscillation of frequency depending on the pulse envelope function $P$ and of amplitude dependent on $\tfrac{1}{2} ak \cos \phi$. The significant fact is that the amplitude is proportional to $\cos \phi$ and will pass through zero as $\cos \phi$ passes through zero, whereas it is desired to obtain an output which is independent of $\phi$ but is otherwise dependent upon the amplitude of the received signal so that information can be derived concerning the reflecting medium or the propagation path of the signal.

The signal now passes through a high gain pulse amplifier 4 to bring its amplitude to a suitable level and wherein the output of the pulse amplifier is designated $P_5$. The output of the pulse amplifier $P_5$ is then fed to a rectifying amplifier 5 which is a linear amplifier wherein the positive and negative excursions present in the input signal amplitude due to the factor $\cos \phi$ will be reproduced as excursions in only one direction. The action is analogous to that of a full wave rectifier circuit wherein a sinusoidal input wave form is converted for instance to a train of positive or negative half sinusoids. This can vary from 0 to a maximum value when $\phi$ is varied in increments as shown in FIGURE 2. However, advantage is taken of the fact that $\phi$ will vary in a semi-random fashion with time on a radar or an ionospheric path, to provide a nett output, $P_6$, proportional to the area under the curve shown in FIGURE 2. Thus $P_6$ is obtained from the rectifying amplifier which integrates return signals from a succession of pulses over a sufficient interval of time with respect to variation of $\cos \phi$ to yield the desired result of an output independent of the phase $\phi$ of the signal $P_1$. This result is achieved moreover without the necessity of finding out the relative phase shift undergone by the pulsed carrier oscillation in travelling from the transmitter to the reflecting medium and from the reflecting medium to the receiver, so that the frequency synthesizer for the transmitter carrier oscillation can also be used directly as the local oscillator.

The R.F. amplifier 2 and local oscillator 3 may be of standard configuration and common to those skilled in the art. The same applies to the rectifying amplifier 5.

The embodiments of the invention in which an exclusive property or privilege is claimed are defined as follows:

1. A receiver in a pulse echo radar system for receiving echo signals comprising pulses of oscillation of which the frequency is known and of which the phase varies as a function of time, depending upon the propagation time from the transmitter to the receiver, comprising means for forming the product of the received pulses and an oscillation of said known frequency, means for selecting from the output of the product forming means the component corresponding to the pulse envelope of the received signal, the amplitude and polarity of said pulse envelope being a function interalia of the phase variation of said oscillation, means for rectifying said pulse envelope component to derive a uni-directional signal containing excursions of only one polarity, and means for integrating said unidirectional signal over an interval of time sufficient to derive an output signal substantially independent of said variations in pulse envelope amplitude and polarity due to said phase variations.

2. A receiver according to claim 1 in which said means for rectifying said pulse envelope component and said means for integrating said unidirectional signal comprises a full wave rectifying amplifier which receives said pulse envelope component as said input signal.

3. A receiver according to claim 1 in which the said product forming means comprises a balanced product detector to which are applied the received pulses and an oscillation obtained from the frequency synthesizer which synthesizes the transmitted oscillation.

4. A Zero I.F. frequency radar pulse signal receiver for reception of a signal comprising pulse of oscillation of which the phase varies as a function of time, said receiver comprising:

(i) an antenna for receiving said radar pulse signal said pulse signal having a signal function defined by $P_1$, where $P_1 = kP \sin (wt + \phi)$ wherein $P =$ a pulse envelope function of said signal $\phi =$ a phase variable $k =$ a constant $w =$ the angular frequency of said signal (ii) a local oscillator having an output ($P_2$) characterized by the equation $P_2 = a \sin wt$ wherein $a =$ a constant (iii) a balanced product detector adapted to receive said signal ($P_1$) from said antenna, and said output ($P_2$) from said local oscillator, said detector having an output ($P_3$) which is the product of said signal ($P_1$) from said antenna and said output from said local oscillator, said output from said detector being characterized by the equation, $P_2 = \frac{1}{2} akP \{\cos (2wt + \phi) + \cos \phi\}$ where Cos $(2wt + \phi)$ is a relatively high frequency component (iv) a filter adapted to receive said detector output, said filter having an output ($P_4$) wherein said high frequency component is substantially removed, said output $P_4$ being represented by $\frac{1}{2} akP \cos \phi$, (v) a zero I.F. pulse amplifier adapted to receive said output ($P_4$) from said filter and having an output ($P_5$), (vi) an amplifier adapted to receive said output ($P_5$) and including rectifying means for rectifying said pulse envelope component to derive a uni-directional signal containing excursions of only one polarity and integrating means to integrate said uni-directional signal and yield an output signal substantially independent of the foctor cos $\phi$ in the amplitude of the signal $P_4$ but otherwise dependent upon said amplitude.

5. The apparatus of claim 3 including a tuned R.F. pre-amplifier for amplifying said radar pulse signal ($P_1$) before being received by said balanced product detector.

References Cited by the Examiner

UNITED STATES PATENTS 2,535,274  12/1950  Dicke _____ 343—7.7 X
3,132,339  5/1964  Boughnon _____ 343—8

CHESTER L. JUSTUS, *Primary Examiner.*

LEWIS H. MYERS, *Examiner.*

R. D. BENNETT, *Assistant Examiner.*